US 7,529,946 B2

(12) United States Patent
Ray et al.

(10) Patent No.: US 7,529,946 B2
(45) Date of Patent: May 5, 2009

(54) ENABLING BITS SEALED TO AN ENFORCEABLY-ISOLATED ENVIRONMENT

(75) Inventors: Kenneth D. Ray, Seattle, WA (US); Paul England, Bellevue, WA (US); Peter Nicholas Biddle, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 806 days.

(21) Appl. No.: 11/155,071

(22) Filed: Jun. 16, 2005

(65) Prior Publication Data
US 2006/0288238 A1 Dec. 21, 2006

(51) Int. Cl.
G06F 11/30 (2006.01)
G06F 12/14 (2006.01)
H04L 9/32 (2006.01)

(52) U.S. Cl. ..................................... 713/193
(58) Field of Classification Search ................. 713/193
See application file for complete search history.

(56) References Cited

U.S. PATENT DOCUMENTS 6,772,340 B1 * 8/2004 Peinado et al. ............. 713/168
7,010,808 B1 * 3/2006 Leung et al. ................. 726/26
7,024,393 B1 * 4/2006 Peinado et al. ................ 705/59
7,051,200 B1 * 5/2006 Manferdelli et al. ........ 713/153
7,383,205 B1 * 6/2008 Peinado et al. ................ 705/26
2003/0200450 A1 10/2003 England et al. ............. 713/189

FOREIGN PATENT DOCUMENTS

AU       200167056 A  *  1/2002
WO       WO 0201334 A2  *  1/2002

OTHER PUBLICATIONS

U.S. Appl. No. 09/227,568, filed Jan. 8, 1999, Paul England.

* cited by examiner

Primary Examiner—Kambiz Zand
Assistant Examiner—Stephen Sanders
(74) Attorney, Agent, or Firm—Woodcock Washburn LLP

(57) ABSTRACT

Prevention of unpermitted use of enabling bits is achieved by sealing the enabling bits to an environment in such a way that the bits can only be unsealed by or from the environment, and by using an isolation mechanism to isolate the environment from other environments on the machine on which the environment operates. The environment is trusted not to use the enabling bits except in accordance with a set of rules governing the bits. The enabling bits may be a decryption key for DRM-protected content, and the rules may be a license governing the use of that content. Trust that the enabling bits will not be misused is established by trusting the environment not to use the enabling bits contrary to the rules, trusting the isolation mechanism to isolate the environment, and trusting the unsealing mechanism only to unseal the bits for the environment.

20 Claims, 4 Drawing Sheets

ENABLING BITS SEALED TO AN ENFORCEABLY-ISOLATED ENVIRONMENT

FIELD OF THE INVENTION

The present invention relates generally to the field of computer security. More particularly, the invention relates to the sealing of enabling bits to a first environment on a machine whose isolation from other environments on that machine can be enforced from an entity outside of the environment, thereby leveraging the existing isolation mechanism to prevent misuse of the enabling bits, or piracy of information protected by the enabling bits.

BACKGROUND OF THE INVENTION

Computer applications that handle valuable information are normally expected to resist misuse of the information. For example, certain systems that handle valuable, copyrighted material such as electronic books, music, movies, etc., are normally expected to take some measures to resist unauthorized copying of the content that these systems handle. (A Digital Rights Management, or "DRM", system is one example of such an application.) Such measures generally assume that a hacker is continually attempting to observe or tamper with a program's inner workings. Thus, applications that seek to prevent their own misuse generally expend some effort and resources to detect and prevent outside attempts to observe or change their inner workings.

For example, valuable content (e.g., a copyrighted song) may by protected by encryption, and an application may be trusted to handle and apply the decryption key for that content so that the content can be decrypted into cleartext and rendered. In another variation on this encryption scheme, the decryption key itself may be protected by encryption, and the application may be trusted to handle an additional decryption key that is used to decrypt the content decryption key. (E.g., the user's machine may be associated with a public/private key pair, and the decryption key for the content may be encrypted with the user's public key prior to delivery to the user's machine.) Regardless of the exact encryption scheme used, it may be the case that the software that handles the keys takes some steps to prevent the keys from being divulged. For example, various systems may obfuscate the code that applies the keys in order to make it difficult for an observer to determine which data actually constitutes the key. Other systems may obfuscate the key, such as by avoiding storing the entire key in memory at one time. While the foregoing describes a problem in terms of protecting content by protecting the key(s) that are used to decrypt the content, in greater generality the problem can be understood as there being some restricted function that requires some data to be performed (i.e., "enabling bits"), where the problem is to protect misuse or divulgence of the enabling bits.

What the above-described systems have in common is that they presume that the environment in which software runs is a dangerous place in which interlopers may be present, and they take active steps to guard against such interlopers. However, certain technologies exist that can be used in a novel way to construct a different solution to the problem of guarding keys or other enabling bits. These technologies include the following:

Trusted Cryptography Module

FIG. 1 shows a trusted cryptography module 8 that exposes certain functions. (Trusted Cryptography Module 8 is sometimes referred to as a Trusted Platform Module, or "TPM".)

Trusted cryptography module 8 maintains a key pair 10, which comprises public key 12 and private key 14. (Typically, each machine on which trusted cryptography module 8 is installed has its own version of key pair 10, so that each machine is associated with its own key pair.) It may be the case that public key 12 is generally known. However, one feature of trusted cryptography module 8 is to perform cryptographic operations using private key 14 without divulgence of private key 14 outside of trusted cryptography module 8. While it will be understood that no computer system is infallible or impervious to attack, trusted cryptography module 8 is presumed to be effective, to a high degree of reliability, at preventing private key 14 from being divulged. Trusted cryptography module 8 is "trusted" to the extent of its effectiveness at preventing divulgence of private key 14.

Trusted cryptography module 8 exposes certain functions that apply key pair 10 to certain input data. These functions include PkSeal 16, PkUnseal 18, and, optionally, Quote 20. These functions operate as follows:

PkSeal 16 is a function that receives as input: text 22 that is to be encrypted, and a rule 24. PkSeal 16 encrypts text 22 and rule 24 together with public key 12, so that the output of PkSeal 16 is an encrypted combination 26 that of text 22 and rule 24.

PkUnseal 18 receives the encrypted combination 26 of text 22 and rule 24, and returns the original (decrypted) text 22 if rule 24 is satisfied—i.e., PkUnseal 18 decrypts the ciphertext that it receives as input, but only if the rule associated with that ciphertext is satisfied.

Typically, rule 24 comprises a requirement that the ciphertext be decrypted only when the decryption is requested by a particular entity. In this case, rule 24 may be represented simply as the hash of the entity that is allowed to request decryption of a particular ciphermessage. In one embodiment the entity could represent the software that is making the call to the TPM, i.e., where hashing the entity directly identifies the software and thus validates the software. Thus, for example, there may be several entities (e.g., computer programs, operating systems, etc.) on a particular machine that can use PkSeal 16 and PkUnseal 18, and if a first entity wants to "seal" a particular message to a second entity (i.e., if the first entity wants to encrypt a message so that the message is decryptable only by the second entity), then the first entity can provide the message to be encrypted to PkSeal 16, while using the hash of the second entity as the rule 24. The output of PkSeal 16 can later be provided as input to PkUnseal 18. However PkUnseal 18 will verify the hash of the entity that calls PkUnseal, and will only provide the decrypted message if the hash of the calling entity matches the hash that is encrypted together with the message.

Trusted cryptography module also exposes Quote 20, which combines a digital signing function with a way to verify the identity of the entity that directs the signing. (Digital signatures are known in the relevant art, and are not described in detail herein.) Quote 20 receives text 22 as input, and returns a digital signature (generated using private key 14) that is based not only on text 22, but also the hash 30 of the entity that invoked Quote 20. The functions of trusted cryptography module 8 may be invoked by various different entities on a single machine (e.g., the functions may be invoked by different operating systems, drivers, or application programs), and the signature generated by Quote 20 is based not only on the text that the caller of Quote 20 provides as input, but also on a hash of that caller, so that the subsequent verifier of the signature can determine who directed that a particular item of data be signed. (It is possible to sign bad data as well as good data. For example, an entity may sign a public key as an averment that the signing entity believes the public key to be associated with a trustworthy source. Quote 20 does not attempt to determine the veracity of that averment, but generates a signature that is partially based on the hash of the entity that directs the signing, so that the identity of that entity can later be verified. The subsequent verifier can then determine whether it trusts the entity that directs the signing, and, based on that trust, can make a judgment as to the reliability of the averment represented by the signing. Quote 20 supports this type of judgment by ensuring that the identity of the entity that directs the signing is bound with the signature.)

Trusted cryptography module 8 may be a dedicated hardware device that is incorporated into a computer—e.g., a chip that resides on the motherboard of a computer, and that maintains some type of physical barrier or physical tamper resistance to prevent divulgence of key pair 10 under inappropriate circumstances. However, the functionality of cryptography module 8 may be implemented as software rather than hardware.

Environment Isolation

FIG. 2 is a block diagram of a computer 60 on which plural, mutually isolated environments are supported. Environments 42(1), 42(2), . . . 42(n) are environments that are mutually isolated from each other in the sense that actions arising in one environment (e.g., environment 42(1)) do not directly affect another environment (e.g., environment 42(2)). Isolation among environments is represented by separations 44. Separations 44 do not necessarily represent physical separation of environments, but rather are separations that may be enforced by a software component such as hypervisor 40.

Hypervisor 40 is a software component that runs on computer 60 and whose functions are to: (1) allow plural environments to run on a single computer 60, and (2) allow each of the environments to operate as if it is the only environment running on computer 60 without the environment having to be concerned with interference from one of the other environments. The portion of hypervisor 40 that provides function (2) is effectively the software that implements separations 44.

Hypervisor 40 can be implemented in a variety of ways, which are known in the relevant art and are therefore not described in detail herein. In one example, hypervisor 40 can expose "virtual hardware" to each of several partitions, so that each environment control the virtual hardware and hypervisor 40 manipulates the actual hardware based on each environment's instructions to control the virtual hardware. In this case, hypervisor 40 manipulates the actual hardware in a way that does not allow the instructions that one environment gives to its virtual hardware to affect another environment.

Environments 42(1), 42(2), . . . , 42(n) can be different operating systems running side-by-side on a single machine. However, programs that do not have the functionality of a traditional operating system can operate as environments within FIG. 2. For example, an application-level program can be configured to run as an environment.

Optionally, computer 60 may include trusted cryptography module 8. Moreover, each of environments 42(1), 42(2), . . . , 42(n) may direct the sealing, unsealing, and quoting of data. Thus, environment 42(1) may use PkSeal 16 to encrypt the data with a hash of environment 42(2) as the associated "rule." Environment 42(2) may then acquire this data (although not necessarily directly from environment 42(1), since hypervisor 40 enforces separation between environments 42(1) and 42(2)), and environment 42(2) may then us PkUnseal 18 to decrypt the data, but PkUnseal 18 will determine, before providing the encrypted data to environment 42(2), that environment 42(2) hashes to the value named as the rule. Also, environment 42(1) can use Quote 20 to sign data, and then pass this signed data to environment 42(2). Environment 42(2) can then verify the signature on the data, and can also verify that the data was signed by trusted cryptography module 8 at the request of environment 42(1). Environment 42(2) can then make a determination about whether it trusts data signed by environment 42(1).

While the above described cryptography module and isolation technologies exist independently, it would be useful to combine and manipulate them, in a way that has not yet been realized in the prior art, to effectuate certain types of security and data protection applications.

SUMMARY OF THE INVENTION

The present invention uses trusted cryptography and environment isolation to implement data protection without the tamper resistance overhead commonly associated with present systems.

Data that is to be distributed is protected by encrypting the data. The decryption key for the data is sealed to a particular environment, for a particular machine. The decryption key may be sealed to the environment, for use on a particular machine, by using a function such as PkSeal to encrypt the key along with the hash of the target environment as the "rule." Thus, when the decryption key is encrypted in this manner, it can be assumed—to the extent that one trusts the relevant cryptography module to decrypt only when permitted by the rule—that the decryption key will only be available to the environment to which the key has been sealed, and when that environment is installed on the machine whose public key is used to encrypt the decryption key.

The environment to which the decryption key is sealed is trusted by the distributor of the decryption key, up to some level of reliability, not to misuse the decryption key, the decrypted data, and is likewise trusted by the distributor to provide reasonable protections against copying and loss of the decrypted data and key. That is, if the distributor of the decryption key places a value on the key not being distributed outside of the environment, then the distributor of the key trusts the environment to which the key is sealed not to send the key outside of that environment. Moreover, by sealing the key with a particular machine's public key, the distributor of the key effectively trusts that machine to implement an isolation mechanism (e.g., hypervisor 40) that will prevent the decrypt key from being misappropriated from the environment by some outside influence. Thus, the trust that the key will not be misused is based on the trust that: (1) the environment to which the key is sealed will not take any action that would divulge the key, and (2) the environment is being run on a machine with an isolation mechanism that will reliably protect the environment from outside influences that would cause it to divulge the key.

It should be noted that protection of a key in this manner allows a content protection system—such as a DRM client—to be implemented without the need for the client software to include its own resistance to outside tampering. Thus, a DRM client that executes as an isolatable environment can be distributed to machines where it is desired to use DRM-protected content. Then, the content can be encrypted with a key, and the key can be included in a license in a form that is sealed to the environment. The environment will then enforce the license, and the machine on which the environment executes will isolate and protect the environment from outside influences, without the client needing to include its own functionality to resist outside influences.

Moreover, as noted above, a decryption key for protected content is merely an example of enabling bits. In greater generality, the above-described structure can be used to protect enabling bits by sealing the enabling bits to the environment that will use the enabling bits.

Other features of the invention are described below.

BRIEF DESCRIPTION OF THE DRAWINGS

The foregoing summary, as well as the following detailed description of the invention, is better understood when read in conjunction with the appended drawings. In order to illustrate the invention, exemplary aspects of the invention are shown. However, the invention is not limited to the specific systems and methods disclosed. The following figures are included.

DETAILED DESCRIPTION OF ILLUSTRATIVE EMBODIMENTS

Overview

The present invention provides a mechanism for protecting enabling bits from misuse. An environment is provided for use on a computer. The computer includes a trusted cryptography module that maintains a key pair, and exposes the functionality to decrypt information encrypted with that key pair and that has been sealed to a particular entity on that computer. Moreover, the computer includes a mechanism that enforces isolation among plural environments on that computer, where each environment can constitute an entity to which encrypted data is sealed. Thus, the enabling bits can be sealed to an environment that is trusted not to misuse those enabling bits, and the isolation mechanism can ensure that the environment will not be manipulated by outside influences into misusing the enabling bits.

By constituting a DRM client as an environment, sealing the decryption key for content to the DRM client, and including the sealed decryption key in a license that the environment is trusted to enforce, the permitted use of a decryption key can be enforced to the extent that the environment and the isolation mechanism are trustworthy—without the client having to contain the functionality to guard itself against external threats. Thus, a trustworthy isolation mechanism, coupled with a trustworthy cryptographic sealing mechanism can be leveraged in a way that protects a DRM client—and the data that the client protects—from external threats without the client having to contain its own functionality to guard itself against external threats.

Example Computing Environment

Figure 3:
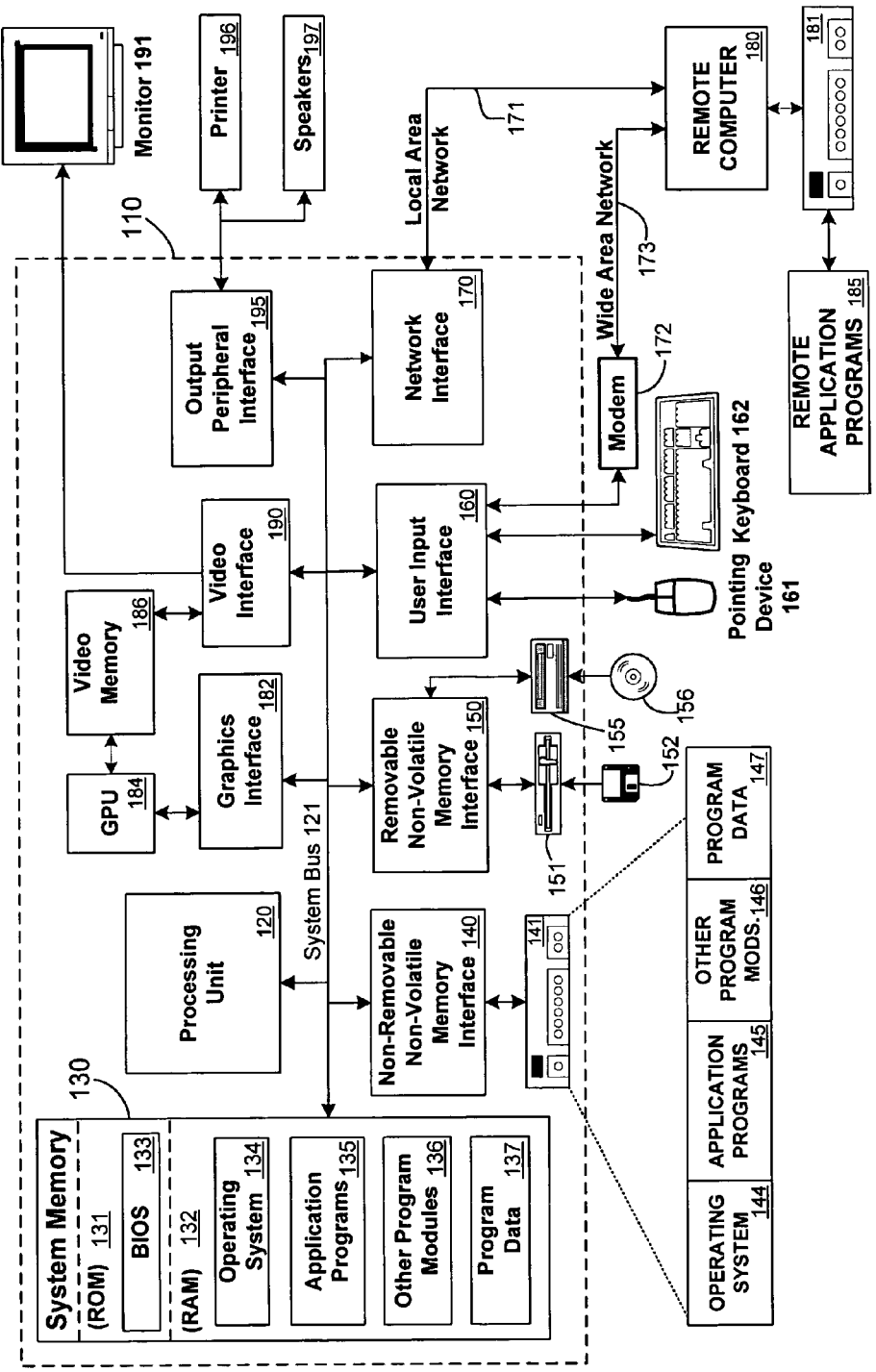
FIG. 3 is a block diagram of an example computing environment in which aspects of the invention may be implemented.

FIG. 3 and the following discussion are intended to provide a brief general description of a suitable computing device in connection with which the invention may be implemented. For example, any of the client and server computers or devices illustrated in FIG. 3 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 3 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 3, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable, volatile/nonvolatile computer storage media. By way of example only, FIG. 3 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3 provide storage of computer readable instructions, data structures, program modules and other data for the computer 110. In FIG. 3, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

Example Environment to Which Enabling Bits May Be Sealed

Figure 1:
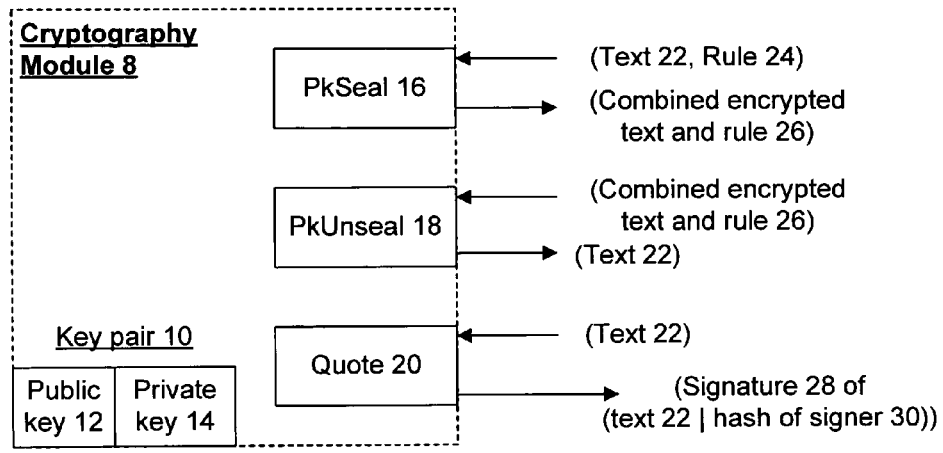
FIG. 1 (prior art) is a block diagram of a trusted cryptography module that exposes certain functions.
Figure 2:
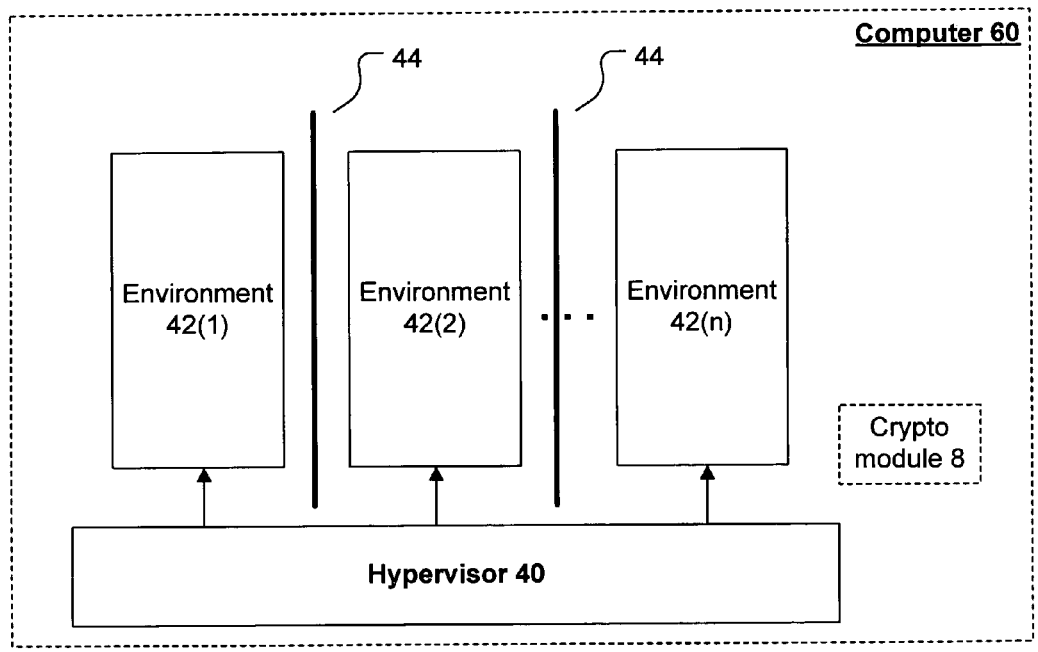
FIG. 2 (prior art) is a block diagram of a computing device on which isolation of environments is enforced by a hypervisor.
Figure 4:
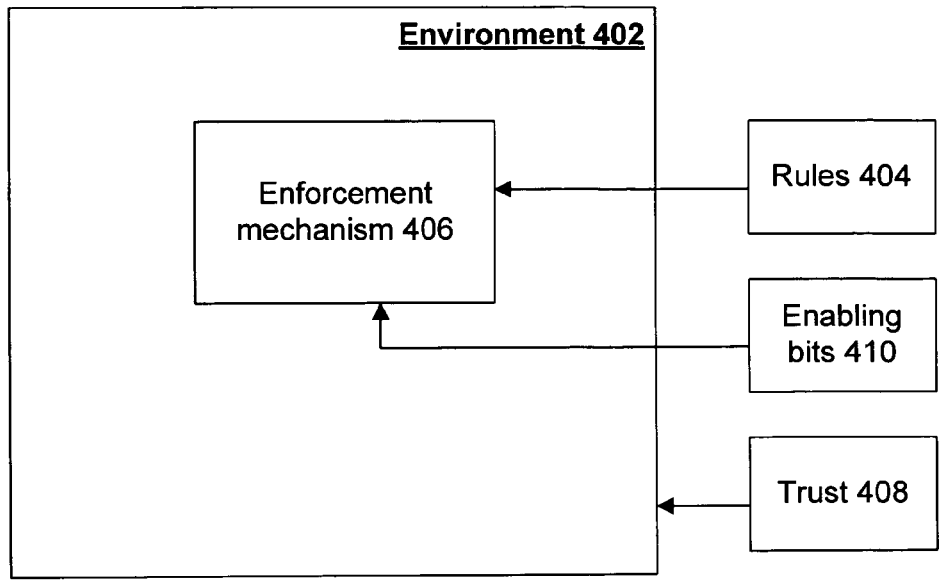
FIG. 4 is a block diagram of an example environment that is entrusted to protect, and enforce rules concerning, a set of enabling bits.

FIG. 4 shows an environment 402, to which enabling bits may be sealed. Environment 402 comprises software that provides some type of execution environment, as more particularly discussed in connection with FIG. 2 above. Environment 402 need not be an operating system. However, environment 402 preferably comprises software whose actions and data may be isolated from other environment in the manner shown in FIG. 2. Somewhere we need to describe that environment 402 must either be directly measurable by the TPM (as is the case with a hypervisor, or be directly measurable by something that is itself also measurable. (e.g. this environment may run on top of a hypervisor and be measured by the hypervisor, where the hypervisor itself is measurable by the TPM, likewise a process may also be measurable by an environment which is itself measurable by the hypervisor, etc., running right on top of the hypervisor.).

For the purpose of FIG. 4, it is assumed that there is some set of enabling bits 410 that will enable some action to be performed in or by environment 402. Rules 404 govern the manner in which enabling bits 410 may be used. Enforcement mechanism 406 enforces rules 404, so that enabling bits 410 are used in a manner consistent with rules 404. For example, rules 404 may state that enabling bits can only be used on three different occasions, or until a set expiration date, or only by certain applications that run in environment 402. In one example, enabling bits 410 constitute a decryption key for an item of content that is to be protected, and rules 404 represent the terms of a license to that piece of content. In such an example, rules 404 govern the manner and circumstances in which the decryption key may be used to decrypt the protected content. Preferably, there are two sets of rules. The first set is the rules that are validated by the measuring entity. These rules put restrictions on what software can open the key, and are generally only based on the hash of the calling environment (as previously described), but could also include other system wide things, such as the user logged on, the time of day, etc. The second set of rules is validated by the calling entity and comprises application specific checks, which can include the user making the access, the time of day, whether or not a credit card has been debited or is properly on file, other accounting, etc. Thus, the distributor of the decryption key is trusting that (a) the TPM will correctly measure the base computing environment, that (b) any subsequent computing environment specified in the sealing of the description key will likewise be properly and inductively measured, and that (c) the final entity to which the decryption key is finally unsealed, will enforce any additional application specific rules. However, it will be understood that the case of a key that decrypts licensed, encrypted content is merely one example of enabling bits 410.

Trust 408 represents a relevant party's level of confidence that environment 408 will not allow enabling bits 410 to be misused. For example, if enabling bits are a decryption key for licensed content, then trust 408 may represent the content owner's level of confidence that environment 402 will only permit the decryption key to be used for decryption of the content when permitted by rules 404.

It should be noted that trust 408 represents confidence that environment 402 will not take steps to divulge enabling bits 410 in contravention of rules 404, but does not necessarily represent any confidence in environment 402's ability to resist an attacker who would attempt to observe enabling bits 410 from outside of environment 402. The isolation of environment 402 from the influence of events that arise outside of environment 402 is performed by an isolation mechanism, such as that described in FIG. 2. Thus, the relevant party can be assured that enabling bits will not be misused to the extent that the relevant party: (1) trusts environment 402 not to intentionally or accidentally divulge or misuse enabling bits 410; (2) trusts an cryptography module (or similar component) not to provide enabling bits 410 to any entity other than environment 402; and (3) trusts an isolation mechanism to isolate environment 402 from outside influence that would cause environment 402 to divulge or misuse enabling bits 410. It is noteworthy that while the use of (2) and (3) in the manner described above greatly relieves environment 402 of the burden of having to protect itself from outside influence, and alleviates the need for either environment 402 or enforcement mechanism 406 to utilize DRM style protection mechanisms, enforcement mechanism 406 must still be engineered not to have standard typical bugs which can cause unexpected and unpredictable behavior, which may allow an outside source to trick enforcement mechanism 406 to divulge the secret. Such bugs are well understood by the industry to be bugs which can cause any system, including non-DRM systems to become vulnerable to outside attack, and include but are no means limited to bugs such as buffer overruns in receive buffers. In short this means that the skill level of the engineer building the Enforcement Mechanism is reduced from that of an engineer skilled in the art of DRM programming to an engineer skilled in the art of writing secure code. It is also noteworthy that the use of (2) and (3) in the manner described above relieves the relevant party (the party who cares about the security of enabling bits 410) of the burden of having to establish trust in environment 402's ability to protect itself from outside influence, and of having to verify and understand the behavior of environment 402 to an extent that would be sufficient to establish such trust. In other words, the combination of (2) and (3) reduces the overhead involved in establishing the trustworthiness and reliability of environment 402, which an engineer skilled in the art of DRM-systems understands to be a large portion of the DRM problem space. Moreover, it should be noted that—to the extent that the capabilities of the hardware are relevant in determining whether the isolation and unsealing mechanisms are reliable—enabling bits 410 may essentially be sealed to a particular hardware installation as well, since a function such as PkUnseal, preferably, only unseals data that has been encrypted with the key pair of the module that implements PkUnseal. Since each machine preferably has a different key pair, it is possible to seal enabling bits 410 only to a trusted machine, thereby effectively leveraging trust in that machine.

License

Figure 5:
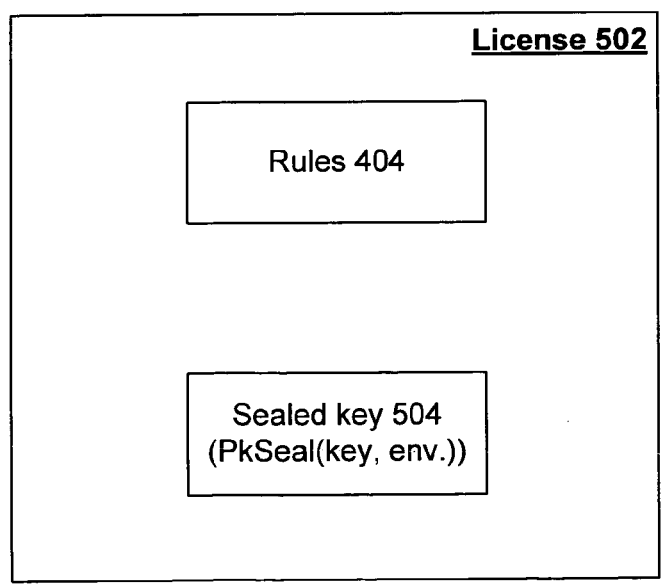
FIG. 5 is a block diagram of an example license that can be used with a Digital Rights Management (DRM) system, where the relevant enabling bits constitute a decryption key for content.

FIG. 5 shows an example license 502 that includes a key sealed to an environment, in accordance with aspects of the invention. License 502 may be used to govern the use content in a content protection system, such as a DRM system.

License 502 includes rules 404. Rules 404 govern the manner in which a particular content item may be used. License 502 also includes a key 504, which is sealed to the environment 402 that will be used to enforce rules 404—i.e., inside environment 402, key 504 will be used to decrypt and render a content item, but only in the manner permitted by rules 404. Key 504 is an example of enabling bits 410.

Key 504, in the example of FIG. 5, is sealed to environment 402 using a cryptographic function such as the PkSeal function discussed above. In this example, the input to PkSeal is the unencrypted version of key 504, and the "rule" used by PkSeal is a hash of the image of the software that implements environment 402. Thus, the PkUnseal function can be used to unseal key 504, but only when the unsealing is requested by environment 402, since the "rule" effectively requires that the unsealing take place only when requested by an entity whose image hashes to the value named in the rule.

An enforcement component 406 that executes in environment 402 (shown in FIG. 4) can use license 502 to enforce a restriction on the use of a content item. Thus, enforcement component 406 evaluates the rules 404 contained in license 502, and, if those rules permit the content item to be used, then enforcement component 406 uses key 504 to decrypt the content item and permit its use. Additionally, if rules 404 permit the content item to be used in a certain way but not in other ways, then enforcement component 406 honors those requirements by permitting use of the content item that is consistent with the rules, and denying other unpermitted uses of the content item. Ultimately, the content owner's assurance that the content item will not be misused is based on the content owner's trust that: (1) key 504, which is needed to decrypt the content, will only be unsealed for environment 402; (2) environment 402 will not divulge key 504, and will not permit any software to execute inside of environment 402 that would divulge key 504; and (3) an isolation mechanism will protect environment 402 from outside influence that might change environment 402's behavior.

Example Process for Protecting Enabling Bits

Figure 6:
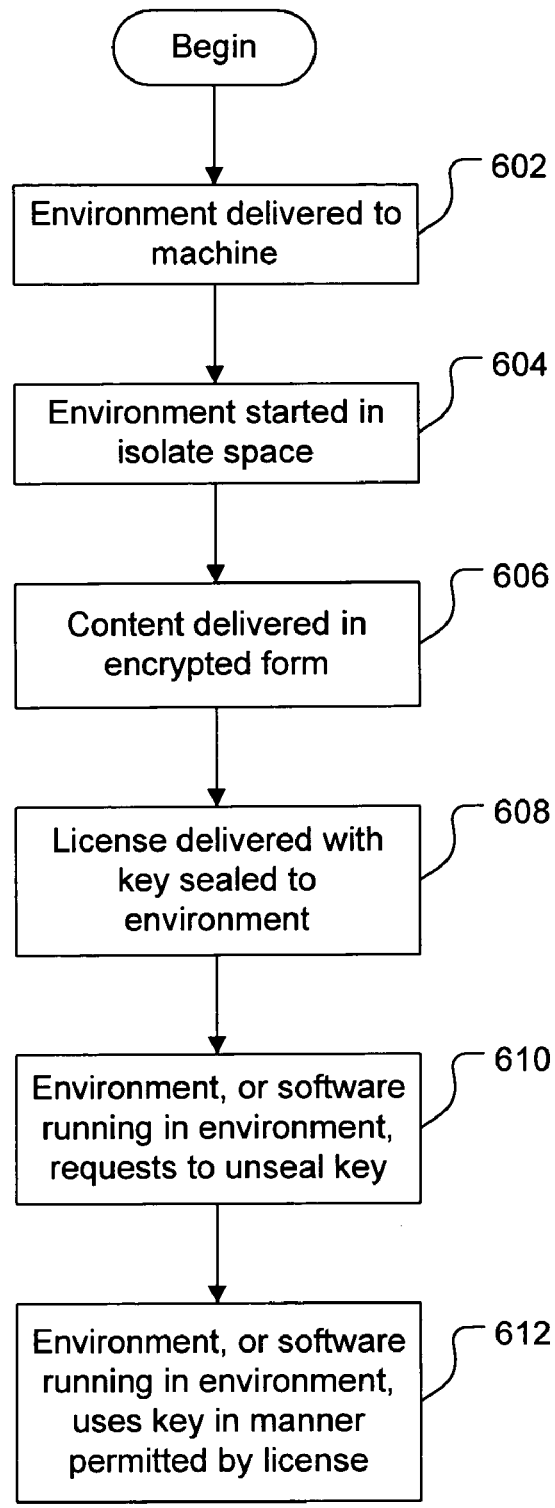
FIG. 6 is a flow diagram of an example method in accordance with features of the invention.

FIG. 6 is a flow diagram of an example method in accordance with features of the invention. The process of FIG. 6 can be used to protect enabling bits from inappropriate use.

At 602, an environment is delivered to a machine. As previously noted, the environment can be an operating system, but can also be a different type of software component that does not meet the normal understanding of the term "operating system."

At 604, the environment is started in an isolated space. As previously noted, certain technologies may be used to run different environments on a single computer, such that some level or type of isolation is maintained between each of the environments. Preferably, the isolation is sufficient such that acts arising in one environment cannot affect another environment, and such that data stored in one environment is not visible to other environments.

At 606, content is delivered to the machine in an encrypted form.

At 608, the license that governs the encrypted content is delivered to the machine. It should be noted that the license and encrypted content need not be delivered in any particular order, and can, optionally, be delivered at the same time. The license includes a key sealed to the environment. Preferably, the key is sealed to the environment by encrypting the key in such a manner that it can be decrypted by a function such as PkUnseal, which would decrypt the sealed key only for the environment to which the key is sealed.

At 610, the environment, or software executing in the environment, requests to unseal the key contained in the license. Assuming that the request to unseal the key comes from the correct entity (i.e., the environment to which the key is sealed), the key will be unsealed.

At 612, the environment, or software executing in that environment, uses the key in the manner permitted in the license. The fact that the key is sealed to a particular environment may represent the key-owning entity's trust that the environment will not use the key in a manner contrary to the license.

Example Scenarios

The following is a description of some example scenarios that may be used with the mechanisms described herein.

In one example, a user may be provided with software on a "try before you buy" basis, where the software will cease to work after some amount of time. In this example, the software is the protected data that is sealed to a particular environment, and the environment enforces the rule that the software should not operate after some number of days (e.g., after 30 days), or after some number of uses.

In another example, standard execution environments that are known to be "good" (i.e., trusted by some defined group of entities, and meeting certain standards of behavioral integrity) can be distributed in advance of the data that is to be protected. Data that needs to be used in a certain manner can then be sealed to these environments, and the prior verification of the behavior of these environments can serve as a basis to trust that the data, when sealed to these environments, will be used correctly. It should be noted that, as an alternative, a special-purpose environment can be created for protected data, and that environment and the data can be provided together to a particular machine; however, creating a special-purpose environment for each piece of data to be protected increases the overhead of protecting data, so it may be useful to provide a set of standard, known "good" execution environments to which data can be sealed.

In another example, an organization, such as a corporation, may have its own environment that is distributed for use on its employees' machines. In this example, sensitive organizational data (e.g., corporate secrets) could be sealed to this environment so such data is only available in an environment whose behavioral integrity has been established to the satisfaction of the organization that owns the data.

In another example, the problem of verifying the expected behavior of an environment can be simplified by essentially reducing the trust space of the environment. For example, an environment can be provided in which no device drivers are installed, and only a small set of approved software modules are allowed to run. In this case, certain potentials for security leaks (e.g., foreign code modules whose behavior is not understood, or device drivers that could send secret data out onto a network) are reduced, thereby simplifying the process of establishing trust in the environment's behavior.

In another example, an environment can be configured to aid in the enforcement of software licensing schemes. For example, a particular piece of code may be licensed for use on the condition that any software that is developed using that piece of code must be licensed to some defined group of parties. An environment can be created that attaches such a license to any software that is distributed out of the environment.

In another example, a computer owner may seal personal data (tax, banking, logon credentials etc.) to an authorized operating system. The system will then prevent an adversary modifying the software environment on the computer to gain unauthorized access to that data.

In another example, an operating environment in a known or believed good state can be furnished with a secret key or credential sealed to that environment. This key or credential may be used to authenticate the platform and the integrity of the environment, since unauthorized modifications to the environment render the key inaccessible. This can be used to gate access to network resources based on the proven integrity of the client machine.

In another example, an operating environment in a known or believed good state can be furnished with a secret known only to the operating system and the authorized user which is then sealed to that environment. The system in the good state can then authenticate itself to the authorized user by revealing the secret if the operating environment. However the secret will not be available if the environment has been corrupted. By these means, authorized users will be able to determine whether they should interact with the system (for instance, reveal PII to the system). Since users are not good at remembering long cryptographic keys, secret images, sounds, words, secret phrases, etc. may be used.

In another example, the definition of operating environment includes the security policy enforced by that operating environment. For example, the operating environment may be a particular release of Microsoft Windows, and the security policy might state the drivers or applications that can run, or any of the rich security and configuration settings offered by that operating system. By such means, sensitive information can be restricted to environments that can be relied upon to not divulge them.

In another example, the definition of operating environment includes rules enforced by applications running within that environment. For example, virus checker may consult and enforce a virus definition file to ascertain the likely trustworthiness of programs and data processed by the operating environment. Data sealed to an environment defined in this way is only accessible when authorized security policies are in place.

Of course, in all of the examples above, the sensitive data, or keys protecting the sensitive data that is sealed to an environment can be revealed by that environment, or by the entity that initially revealed the data to that environment. This suggests at least two ways that an operating environment can migrate data to a new operating environment securely: (a) the authorized environment can re-seal data to that new environment (with that environment authorized by the user or with the assistance of cryptography or network services), or (b) the server can release the sensitive data to the new environment.

While the present invention has been described in connection with the preferred aspects, as illustrated in the various figures, it is understood that other similar aspects may be used or modifications and additions may be made to the described aspects for performing the same function of the present invention without deviating therefrom. However, other equivalent devices to this aspect of the invention are also contemplated by the teachings herein. Therefore, the present invention should not be limited to any single aspect, but rather construed in breadth and scope in accordance with the appended claims.

What is claimed:

1. A method of enforcing rules on the use of first data, the method comprising:
    establishing a first trust in a first component that said first component will unseal data only for an entity to which the data is sealed;
    establishing a second trust in a second component that said second component will provide mutually isolated environments operating within a machine, such that data within each of the environments on the machine is isolated from acts arising in other environments on the machine, and such that data within each of the environments is not visible to other environments on the machine;
    establishing a third trust in one of the environments operating within the machine, the first data being sealed to said one of the environments, said one of the environments being configured to enforce a rule as to the first data, or to execute software that enforces said rule as to the use of the first data, said third trust representing an expectation that said one of the environments will not use the first data in a manner contrary to said rule;
    providing the first data in a secure form, and said rule, to said one of the environments, the first data being stored within said one of the environments, and the first data comprises a key;
    using said second component to isolate said first data within said one of the environments from acts of the other environments;
    using said second component to prevent said first data from being visible to environments other than the environment containing said first data;
    using said first component to unseal the first data for only said one of the environments; and
    using, by said one of the environments, the first data only in a manner permitted by said rule.

2. The method of claim 1, wherein said first data comprises a key that decrypts a content item, wherein said rule specifies a manner in which said content item is permitted to be used, and wherein using the first data only in a manner permitted by said rule comprises decrypting said content item with said key and enforcing a limit on usage of the content item.

3. The method of claim 1, wherein said first data enables the use of information, wherein a party has an economic, proprietary, or secrecy interest in said information, and wherein said first trust, said second trust, and said third trust are established to the satisfaction of, or to a standard established by, said party.

4. The method of claim 3, wherein said party need not trust said environment's ability to resist having said environment's behavior influenced by events that arise outside of said environment.

5. The method of claim 1, wherein there are a plurality of entities that trust said environment, and wherein trust of said environment by said plurality of entities is established prior to delivery of said first data to said machine.

6. The method of claim 1, wherein said first data comprises source code that is subject to a first set of license terms, and wherein said rule comprises a requirement that any software derived from said source code is to be provided with a second set of license terms, said second set of license terms being either the same as, or different from, said first set of license terms.

7. The method of claim 1, further comprising:
    establishing fourth trust in said machine;
    wherein said first data is sealed to said environment in such a manner that said first data is only unsealable when said environment is executing on said machine, and not when said environment is executing on any device other than said machine.

8. A computer-readable medium encoded with sets of computer-executable instructions, the sets of instructions comprising:
    a first set of instructions that performs acts comprising:
        instantiating plural environments on a computing device; and
        maintaining a level of isolation between said plural environments, wherein the level of isolation prevents data within each of the environments from being visible to the other environments, and isolates acts on each of the environments from the other environments, wherein the data comprises a key; and
    a second set of instructions distinct from said first set of instructions that, when instantiated, constitutes one of said plurality of environments, and that performs acts comprising:
    issuing a request to unseal first data that has been sealed to said second set of instructions;
    receiving a set of rules associated with said first data; and
    enforcing said set of rules such that said first data is not used in a manner contrary to said set of rules;
    wherein said first data comprises a hash of said second set of instructions and wherein said request to unseal said first data is received by a module that will not unseal said first data unless said request to unseal has been received from said first set of instructions, or from software that operates within the environment constituted by said first set of instructions.

9. The computer-readable medium of claim 8, wherein said first data comprises a key that decrypts a content item, wherein said set of rules specifies a manner in which said content item is permitted to be used, and wherein said enforcing act comprises decrypting said content item with said key and enforcing a limit on usage of the content item.

10. The computer-readable medium of claim 8, where said first data is used to decrypt information in which a party has an economic, proprietary, or secrecy interest, and wherein said party has trust comprising:
   a first trust that said first set of instructions will maintain said level of isolation between said plurality of environments, said level meeting a standard established or imposed by said party;
   a second trust that said second set of instructions will not use said first data in a manner contrary to said set of rules; and
   a third trust that said module will not unseal said first data unless the request to unseal said first data has been received from said environment or from software operating under said environment.

11. The computer-readable medium of claim 10, wherein said party need not trust said second set of instructions' ability to resist being influenced by behavior arising outside of said environment, which behavior, in the absence of said level of isolation maintained by said first set of instructions, would cause said second set of instructions to use said first data, or said information decrypted by said first data, in a manner contrary to said set of rules.

12. The computer readable medium of claim 8, wherein there are a plurality of entities that trust said second set of instructions, and wherein trust of said second set of instructions by said plurality of entities is established prior to delivery of said first data to said computing device.

13. The computer-readable medium of claim 8, further comprising:
   establishing trust in said computing device;
   wherein said first data is sealed to said environment in such a manner that said first data is only unsealable when said second set of instructions is executing on said computing device, and not when said environment is executing on any machine other than said computing device.

14. In system that comprises:
   an isolation mechanism that enables a plurality of environments to be instantiated on a computing device and that maintains a level of isolation among said plurality of environments, wherein the isolation mechanism prevents data within each of the environments from being visible to the other environments, and wherein the isolation mechanism isolates acts on each of the environments from the other environments, wherein the data comprises a key; and
   an unsealing mechanism that receives a request to unseal data and that unseals the data only if the request has been received from an entity to which the data is sealed;
   the improvement comprising:
   an environment that can be on the computing device and that can be isolated from other environments on said computing device by said isolation mechanism, said environment issuing a request to said unsealing mechanism to unseal first data, said environment enforcing a set of rules governing the use of said first data, said environment,
   wherein an owner of said first data, or a party having an interest in said first data, has established first trust in said isolation mechanism and second trust in said unsealing mechanism, and relies on said environment preventing said first data from being used contrary to said set of rules based on said first trust and on said second trust, without establishing trust that said environment will resist attempts from outside of said environment to misuse said first data.

15. The system of claim 14, wherein said first data comprises a key that decrypts a content item, wherein said set of rules specifies a manner in which said content item is permitted to be used, and wherein enforcing said set of rules comprises decrypting said content item with said key and enforcing a limit on usage of the content item.

16. The system of claim 14, wherein said first data enables the use of information, wherein said owner or said party has an economic, proprietary, or secrecy interest in said information, and wherein said first trust and said second trust are established to a standard established or imposed by said owner or said party.

17. The system of claim 16, wherein said owner or said party need not trust said environment's ability to resist having said environment's behavior influenced by events that arise outside of said environment which, in the absence of said isolation mechanism, would cause said environment to use said first data, or said information that is enabled by the use of said first data, in a manner contrary to said set of rules.

18. The system of claim 14, wherein said owner or said party has established a third trust that said environment will not, in the absence of influence from outside of said environment, use said first data in a manner that is contrary to said set of rules.

19. The system of claim 14, wherein there are a plurality of entities that trust said environment, and wherein trust of said environment by said plurality of entities is established prior to delivery of said first data to said computing device.

20. The system of claim 14, further comprising:
   establishing third trust in said computing device;
   wherein said first data is sealed to said environment in such a manner that said first data is only unsealable when said environment is executing on said computing device, and not when said environment is executing on any machine other than said computing device.

* * * * *